US006417494B1

(12) United States Patent
Westerberg et al.

(10) Patent No.: US 6,417,494 B1
(45) Date of Patent: Jul. 9, 2002

(54) SCANNING LIGHTWAVE OVEN AND METHOD OF OPERATING THE SAME

(75) Inventors: Eugene R. Westerberg, Palo Alto; William H. Schestedt, Santa Clara, both of CA (US); William P. Minnear, Clifton, NY (US); Jay G. Romiti, Santa Clara, CA (US)

(73) Assignee: Quadlux, Inc., Orinda, CA (US)

( * ) Notice: Subject to any disclaimer, the term of this patent is extended or adjusted under 35 U.S.C. 154(b) by 0 days.

(21) Appl. No.: 09/479,784

(22) Filed: Jan. 7, 2000

Related U.S. Application Data

(60) Provisional application No. 60/115,160, filed on Jan. 8, 1999.

(51) Int. Cl.$^{7}$ .......................... A47J 37/34; A21B 1/14; A21B 1/22

(52) U.S. Cl. ........................ 219/402; 219/405; 219/411

(58) Field of Search ................................ 219/404, 405, 219/410, 411, 402; 99/388, 390, 401, 447; 392/407, 412, 413, 415, 416, 421, 423

(56) References Cited

U.S. PATENT DOCUMENTS 4,374,319 A * 2/1983 Guibert ...................... 219/405
4,516,486 A * 5/1985 Burkhart ...................... 99/388
4,728,777 A * 3/1988 Tsisios et al. ............... 219/405
5,036,179 A * 7/1991 Westerberg et al. ........ 219/411
5,378,872 A 1/1995 Jovanovic ................... 219/388
5,712,464 A * 1/1998 Westerberg ................. 219/411
5,805,769 A 9/1998 Cook et al. ................. 392/421

FOREIGN PATENT DOCUMENTS

EP 221686 * 5/1987
EP 86307753.3 5/1987 ............. F24C/3/06

* cited by examiner

*Primary Examiner*—Joseph Pelham
(74) *Attorney, Agent, or Firm*—Gray Cary Ware & Freidenrich LLP

(57) ABSTRACT

The present invention is a lightwave oven that includes an oven chamber, a food support within the oven chamber, and a lightwave cooking lamp moveably mounted within the oven chamber between a first position in which the lamp is positioned to direct radiant energy onto a first area of the food support and a second position in which the lamp is positioned to direct radiant energy onto a second, separate, area of the food support. The lamp is illuminated and made to scan, preferably multiple times, across the food so as to cook the food.

11 Claims, 4 Drawing Sheets

| | | |
|---|---|---|
| Large Pillsbury biscuits | Top lamp only - 9 minutes browned top and bottom. | Internal temperature 200 - 207 F. Excellent results. |
| Tombstone pizza (self-rising crust) | Grill mode - 2 minutes<br>Brown mode - 9 minutes (Compare to package recommended conventional cook time of 17 -20 minutes) | Internal temperature 180 - 205 F. Good results. |
| Toasted bagels | Top Lamp only - 5 minutes. | Golden brown. |
| 1/2 chicken cut into pieces | 22 minutes | Internal temperature 187 - 195 F. Execellent results. |
| 8 chocolate chip cookies - Pillsbury refrigerator dough | 7 minutes (compared to package-recommended time of 10 - 13 minutes) | Good Results |
| 5 bratwurst | Top lamp only - 14 minutes | Internal temp. 211 F. Excellent. |
| .74 lb porterhouse steak | Top lamp only - 10 minutes | Internal temp. 185 F. Good. |
| 3.84 lb whole chicken | Cook mode 40 minutes | Internal temp. 170 - 208 F. Good. |
| 8 inch diameter gourmet pizza | 3 minute pan warm up (grill mode)<br>6 1/2 minute brown mode | Internal temp. 214 F. Excellent. |
| .83 lb beef ribeye spencer steak | 12 minutes cook mode | Internal temp. 212 F |
| 9 x 13" yellow cake | 18 minutes cook mode | Some dark areas. |
| 9 x 13" yellow lemon cake | 5 minutes cook mode<br>13 minutes brown mode | |
| 3/4 inch hamburger pattie | 9 minutes cook mode | Temp 195 F. Good |
| Banquet TV dinner | 13 minutes cook mode (Compare to package-recommended 25 - 28 min) | Temp 185 - 195 F. Excellent. |
| 2.94 lb turkey breast (roast) | 50 minutes - top lamp only (Compare to package-recommended 90 - 120 min.) | Excellent. |
| 2.42 lb marinated tri-tip roast | 50 minutes - top lamp only (Compare to package-recommended 90 - 120 minutes) | Excellent. |
| Pillsbury corn bread twists | 10 minutes/30 seconds - top lamp only | Excellent. Internal temperature 212 F. |
| 2.63 lb marinated tri-tip roast under clear TV dinner wrap | 50 minutes (Compare to package-recommended 90 - 120 minutes) | Excellent. |
| 8 slices of bacon | 9 minutes cook mode - no need to flip bacon | Fairly crispy. |
| 2 eggs sunnyside up. | 5 minutes cook mode. | Good. |

FIG. 3

SCANNING LIGHTWAVE OVEN AND METHOD OF OPERATING THE SAME

This application claims benefit of Provisional No. 60/115,160 filed Jan. 8, 1999.

FIELD OF THE INVENTION

This invention relates to the field of cooking ovens. More particularly, this invention relates to an improved lightwave oven configuration for cooking with radiant energy in the electromagnetic spectrum including a significant portion in the near-visible and visible ranges.

BACKGROUND OF THE INVENTION

Ovens for cooking and baking food have been known and used for thousands of years. Basically, these well-known oven types can be categorized in four cooking forms; conduction cooking, convection cooking, infrared radiation cooking and microwave radiation cooking.

There are subtle differences between cooking and baking. Cooking just requires the heating of the food. Baking of a product from a dough, such as bread, cake, crust or pastry, requires not only heating of the product throughout, but also chemical reactions coupled with driving the water from the dough in a predetermined fashion to achieve the correct consistency of the final product and finally browning the outside of the product. Following a recipe is very important for proper results during the baking operation. An attempt to decrease the baking time in a conventional oven by increasing the temperature results in a damaged or destroyed product.

In general, there are problems when one wants to cook or bake foodstuffs with high-quality results in the shortest times. Conduction and convection provide the necessary quality, but both are inherently slow energy transfer methods. Long-wave infrared radiation can provide faster heating rates, but it only heats the surface area of most foodstuffs, leaving the internal heat energy to be transferred by much slower conduction. Furthermore, the shallow heating depth limits the rate at which heat energy can be introduced to a product, because high radiant powers at the food surface result in a burned food interface. Microwave radiation heats the foodstuff very quickly in depth, but during baking the loss of water near the surface stops the heating process before any satisfactory browning occurs. Consequently, microwave ovens cannot produce quality baked foodstuffs, such as bread.

Radiant cooking methods can be classified by the manner in which the radiation interacts with the foodstuff molecules. For example, starting with the longest wavelengths for cooking, the microwave region, most of the heating occurs because of the coupling of radiant energy into the bipolar water molecules causing them to rotate and thereby absorb energy to produce heat. Decreasing the wavelength to the long-wave infra-red regime, the molecules and their component atoms resonantly absorb the energy in well-defined excitation bands. This is mainly a vibrational energy absorption process. In the near-visible region, the main part of the absorption is due to higher frequency coupling to the vibrational modes. In the visible region, the principal absorption mechanism is excitation of the electrons that couple the atoms to form the molecules. These interactions are easily discerned in the visible band of the spectrum, where they are identified as "color" absorptions. Finally, in the ultraviolet, the wavelength is short enough, and the energy of the radiation is sufficient to actually remove the electrons from their component atoms, thereby creating ionized states and breaking chemical bonds. This short wavelength, while it finds uses in sterilization techniques, probably has little use in foodstuff heating, because it promotes chemical reactions and destroys food molecules.

Lightwave ovens are capable of cooking and baking food products in times much shorter than conventional ovens. This cooking speed is attributable to the range of wavelengths and power levels that are used.

Typically, wavelengths in the visible range (0.39 to 0.77 $\mu$m) and the near-visible range (0.77 to 1.4 $\mu$m) have a fairly deep penetration in most foodstuffs. This range of penetration is mainly governed by the absorption properties of water which is the principal constituent of most foodstuffs. The characteristic penetration distance for water varies from 30 meters in the visible to about 1 cm at 1.4 $\mu$m. Several other factors modify this basic absorption penetration. In the visible region electronic absorption (color absorption) reduces the penetration substantially, while scattering in the food product can be a strong factor throughout the region of deep penetration. Measurements show that the typical average penetration distance for light in the visible and near-visible region of the spectrum varies from 2–4 mm for meats to as deep as 10 mm in some baked goods and liquids like non-fat milk.

It is this region of deep penetration that produces that fast cooking times seen in lightwave ovens. Because the energy is deposited in a fairly thick region near the surface of the food, the radiant power density that impinges on the food can be increased in lightwave ovens without overheating the surface temperature of the foodstuff. Consequently the radiation in the visible and near-visible regions does not contribute greatly to the exterior surface browning.

In the spectral region above 1.4 $\mu$m (infra-red region), the penetration distance decreases dramatically to fractions of a millimeter, and for certain peaks down to 100 $\mu$m (the thickness of a human hair). The power in this region is absorbed in such a small depth of penetration that the temperature at the surface rises rapidly, driving the water out and forming a water-depleted crust. With no water to evaporate and cool the surface, the temperature can climb very fast to 300° F. This is the approximate temperature where the set of browning reactions (Maillard reactions) are initiated. As the temperature is pushed even higher to above 400° F., the point is reached where the surface begins to burn.

It is the balance between the deep penetration wavelengths (0.39 to 1.4 $\mu$m) and the shallow penetration wavelengths (1.4 $\mu$m and greater) that allows the power density at the surface of the food to be increased in the lightwave oven, to cook the food rapidly with the shorter wavelengths and to brown the food with the longer infra-red so that a high-quality product is produced. Conventional ovens do not have the shorter wavelength components of radiant energy. The resulting shallower penetration means that increasing the radiant power in such an oven only heats the food surface faster, prematurely browning the food before its interior gets hot.

Conventional ovens operate with radiant power densities as high as about 0.3 W/cm$^2$ (i.e., at 400° F.). The cooking speeds of conventional ovens cannot be appreciably increased simply by increasing the cooking temperature, because increased cooking temperatures drive water off the food surface and cause browning and searing of the food surface before the food's interior has been brought up to the proper temperature. In contrast, lightwave ovens have been operated from approximately 0.8 to 5 W/cm$^2$ of visible, near-visible and infra-red radiation, which results in greatly enhanced cooking speeds.

For high-quality cooking and baking, the applicant has found that a good balance ratio between the deeply penetrating and the surface heating portions of the impinging radiant energy is about 50:50, i.e., Power(0.39 $\mu$m to 1.4 $\mu$m/Power(1.4 $\mu$m and greater)$\approx$1. Ratios higher than this value can be used, and are useful in cooking especially thick food items, but radiation sources with these high ratios are difficult and expensive to obtain. Fast cooking can be accomplished with a ratio substantially below 1, and the applicant has shown that enhanced cooking and baking can be achieved with ratios down to at least 0.6 for most foods, and lower for thin foods and foods with a large portion of water such as meats. If the power ratio is reduced below about 0.3, the power densities that can be used in cooking are comparable with conventional cooking and no speed advantage results.

If blackbody sources are used to supply the radiant power, the power ratio can be translated into effective color temperatures, peak intensities, and visible component percentages. For example, to obtain a power ratio of 1, it can be calculated that the corresponding blackbody would have a temperature of 3000° K, with a peak intensity at 0.966 $\mu$m and with 12% of the radiation in the visible ranges of 0.39 to 0.77 $\mu$m. Tungsten halogen quartz lamps have spectral characteristics that follow the blackbody radiation curves fairly closely. Commercially available tungsten halogen bulbs have been successfully used as light sources for cooking with color temperatures as high as 3400° K. Unfortunately, the lifetime of such sources falls dramatically at high color temperatures (at temperatures above 3200° K it is generally less than 100 hours). It has been determined that a good compromise in bulb lifetime and cooking speed can be obtained for tungsten halogen bulbs operated at about 2900 to 3000° K. As the color temperature of the bulb is further reduced and more of the shallow-penetrating infrared is produced, the cooking and baking speeds are diminished for quality results. For most foods there is a discernible speed advantage with color temperatures down to about 2500° K (blackbody peak at about 1.2 m and visible component of 5.5%). In the region of 2100° K the speed advantage over convention thermal ovens vanishes for virtually all foods that have been tried.

There is a need for a residential lightwave oven that would display the characteristics of enhanced cooking speed and high quality cooking results generally associated with commercially available lightwave ovens. Various configurations of such an oven should allow it to be produced in a variety of configurations, such as a countertop oven, a built-in wall oven, the oven in a cooking range, and an over-the-range oven.

There is a need that for most applications such an oven should function with the power available in the average kitchen, i.e., from 240V, 50 A to as low as 120V, 15 A.

Finally, there is a need to provide such an oven at a price that is competitive with other cooking appliances currently available.

SUMMARY OF THE INVENTION

It is an object of the present invention to provide a lightwave oven that operates with commercially available tungsten-halogen quartz lamps using powers as low as 1500 W from a standard kitchen 120VAC, 15 amp power outlet, and to provide a power density inside the oven cavity that cooks food faster than conventional thermal ovens.

It is another object of the present invention to provide a means of improving the oven efficiency, so that the small amounts of power available in residential locations can be utilized more efficiently to cook faster than other lightwave oven configurations.

It is yet another object of the present invention to provide a lightwave oven that is configured as simply as possible to reduce the cost of lightwave technology so as to allow competitive pricing with the slower, conventional cooking appliances.

It is yet another object of the present invention to provide uniform cooking in the lightwave oven.

It is yet another object of the present invention to provide means for improving the browning characteristics over presently accepted lightwave oven designs.

It is yet another object of the present invention to provide different modes of operation to cook, crisp, grill, defrost, warm, and bake different foods and different surfaces of foods.

It is yet another object of the present invention to reduce the flicker induced in the residential wiring due to the inrush currents associated with the turn-on characteristics of the filaments of tungsten lamps.

The present invention is a lightwave oven that includes an oven chamber, a food support within the oven chamber, and a lightwave cooking lamp moveably mounted within the oven chamber between a first position in which the lamp is positioned to direct radiant energy onto a first area of the food support and a second position in which the lamp is positioned to direct radiant energy onto a second, separate, area of the food support. The lamp is illuminated and made to scan, preferably multiple times, across the food so as to cook the food.

BRIEF DESCRIPTION OF THE DRAWINGS

FIG. 3 is a table listing examples of foods cooked in an oven utilizing principles of the present invention, together with their corresponding cooking times.

DETAILED DESCRIPTION OF THE PREFERRED EMBODIMENT

It has been discovered that a very simple and inexpensive version of a lightwave oven can be produced by providing means for scanning one or more tubular tungsten-halogen lamps past the surface of a foodstuff so as to, in essence, paint the food with radiant energy. Furthermore, enhanced browning characteristics and higher efficiencies were found to result from providing each scanned lamp with a novel focused reflector assembly. Methods were discovered whereby the energy density, and hence the cooking rate could be varied not only by controlling the intensities of the lamps, but also by controlling the relative speed of the scan at various positions in the oven. Because of this discovery, the number of times that the lamps are turned on and off during a cooking cycle is reduced, and hence the associated flicker (i.e. the dimming of lamps within a household in response to the powering on of the appliance) is reduced and can be virtually eliminated. The variable scan rates can be used to define various modes of cooking, including baking, grilling, warming, defrosting and crisping.

The invention described herein resulted from the discovery that if a tubular tungsten-halogen lamp was slowly scanned past a foodstuff at constant velocity, the foodstuff was heated in a uniform manner to a width slightly larger than the lamp filament length. More importantly it was discovered that the act of passing the lamp over the food heated the food and removed some of the surface water, but that since the lamp did not dwell at any particular location the water was replenished from the subsurface supply before the next scan. Thus, there was always a fresh supply of water at the surface of the food, and this water with its high heat of vaporization effectively protected the surface of the foodstuff from overheating and burning. Based on this observation it was determined that the efficiency of food heating could be improved by focusing the scanned beam to obtain substantially higher power densities at the food surface. Using lamps with color temperatures of 2800 to 3000° K it was found that an oven with very uniform intensity and unexpected efficiency could be constructed for deeply and speedily heating all manner of foodstuffs with lightwave energy.

Figure 1A:
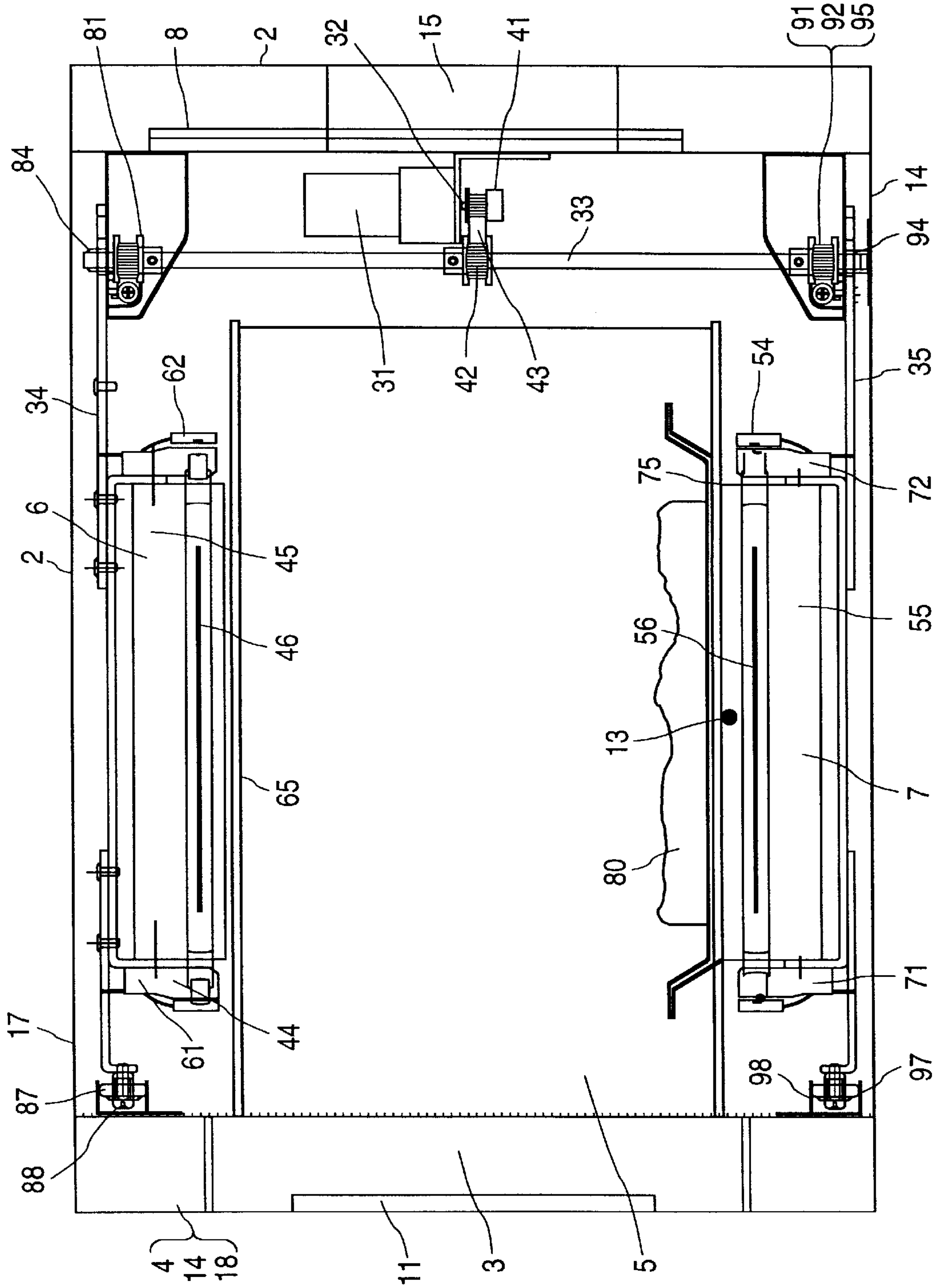
FIG. 1A is a side cross-sectional view of the lightwave oven of the present invention.
Figure 1B:
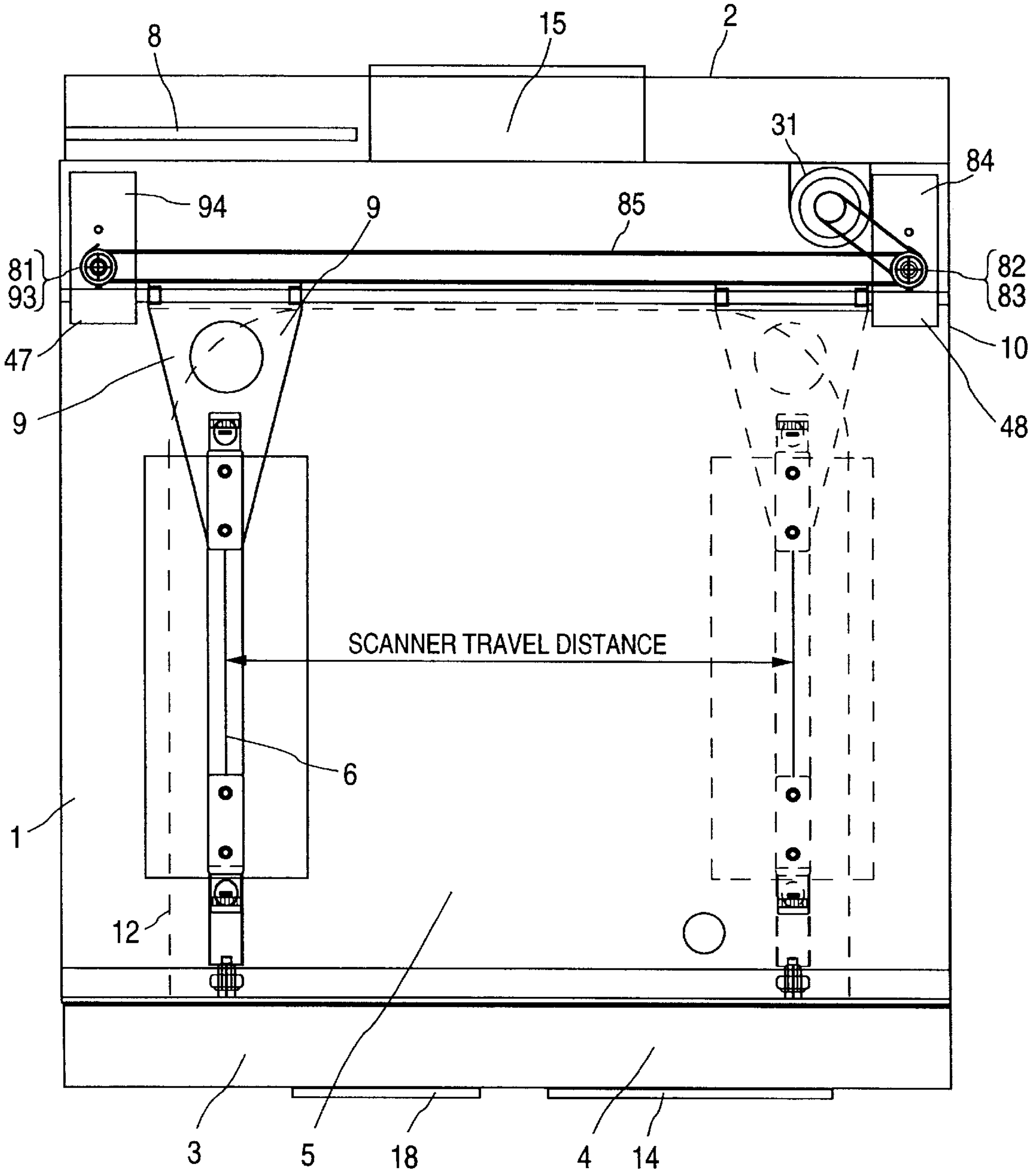
FIG. 1B is a top cross-sectional view of the lightwave oven of the present invention.

The scanned lightwave oven of the present invention is illustrated in FIGS. 1A–1B. The lightwave oven 1 includes a housing 2, a door 3, a control panel 4, an oven cavity 5, an upper lamp assembly 6, a lower lamp assembly 7, an electronic controller 8 and a scan mechanism 9.

The housing 2 includes sidewalls 10, top wall 17, and bottom wall 14. The door 3 is rotatably attached to one of the sidewalls 10. The control panel 4 is located above the door 3 and is connected to the electronic controller 8. The control panel 4 contains several operation keys 14 for controlling the lightwave oven 1, and a display 18 indicating the oven's mode of operation.

The oven cavity 5 is defined by a U-shaped interior sidewall 12, an upper lamp assembly 6 at an upper end of sidewall 12, a lower lamp assembly 7 at the lower end of sidewall 12, and the door 3.

A lamp 46 is positioned in the upper lamp assembly 6 and a lamp 56 is housed in the lower lamp assembly 7. The lamp 46 is held in place and electrically connected through the two upper sockets 61 and 62 and lamp 56 is connected through lower sockets 71 and 72.

The upper lamp assembly 6 is protected from splatters and cooking juices by an upper lamp shield 65 at the top of the cooking cavity 5. This shield is transparent to the light from the top lamp 46 and has high strength to resist breakage and a small temperature expansion coefficient to enable it to withstand temperature gradients without cracking. Materials like Pyrex glass and glass ceramic products like Pyroceram have been used in this application.

In a similar fashion the lower lamp assembly 7 is protected from splatters and grease by a similar shield 75 at the bottom of the oven cavity 5. However, depending on the mode of oven operation, this shield can be made of low temperature coefficient glass or glass ceramic like the upper glass or a metallic shield that has high heat conductivity such as aluminum or steel.

Electronic controller 8 controls the scan mechanism 9. Scan mechanism 9 includes a motor 31 controlled directly from the electronic controller 8, a drive shaft 33 (FIG. 1A), and two scanning lamp mechanisms, an upper scanning lamp mechanism 34 located within the upper lamp assembly 6, and a lower scanning lamp mechanism 35 located within the lower lamp assembly 7.

Motor shaft 32 and drive shaft 33 are connected to rotate together with the aid of belt pulleys 41 and 42 and the toothed belt 43. Drive shaft 33 is secured in place with upper bearing 84 and lower bearing 94.

Upper scanning lamp mechanism 34 utilizes of two pulleys. A first pulley 81 is attached near the top of the drive shaft 33 and a second pulley 82 is attached to a shaft 83 in a bearing block 84. Upper scanning lamp mechanism 34 further includes a belt 85 connecting the two pulleys, 81 and 82, a lamp fixture 44, an end roller bearing 87, and a bearing guide 88 as well as the lamp reflector 45 and tungsten-halogen lamp 46. Belt 85 is attached to one end of lamp fixture 44 while the roller bearing 87 is attached to the other end of lamp fixture 44 and rolls within the bearing guide 88 to allow the lamp 46 and its reflector 45 to be smoothly scanned left and right across the top of the oven.

The envelope of the motion of the upper lamp 46 is controlled by two microswitches 47 and 48, which are activated by the motion of the upper lamp scanning mechanism 34. Electronic controller 8 reverses the motor 31 when either of the switches 47 or 48 is activated, thus controlling the scan at a linear rate over a food item 80 placed in the cavity 5.

The lower scanning lamp mechanism 35 utilizes two pulleys, one pulley 91 attached near the bottom of the drive shaft 33 and the other pulley 92 attached to a shaft 93 in a bearing block 94. Lower scanning lamp mechanism 35 further includes a belt 95 connecting the two pulleys, 91 and 92, a lamp fixture 54, an end roller bearing 97, a bearing guide 98, as well as the lamp reflector 55 and tungsten-halogen lamp 56. Belt 95 is attached to one end of lamp fixture 54 while the roller bearing 97 is attached to the other end of lamp fixture 54 and rolls within the bearing guide 98 to allow the lamp 56 and its reflector 55 to be smoothly scanned left and right across the bottom of the oven.

The electronic controller 8, the lamps 46, 56 and their sockets 61, 62, 71, 72 are cooled with the aid of the fan 15 which is attached to the back of the housing 2.

The operation of the oven of the present invention can be described as follows. A foodstuff 80 in a suitable container is placed in the oven cavity 5 on top of the bottom shield 75. Virtually any container that can be used in a conventional thermal oven can be used in this embodiment. In one embodiment, oven cavity 5 is approximately 8" high by 15.5" wide by 14.5" deep and can easily accommodate a 12" diameter pizza pan or a standard 9"×13" baking pan. The U-shaped cavity walls 12 are made of a material that is highly reflecting for the most of the full spectrum of the lamps. This property improves the overall efficiency of the oven by reflecting secondary light rays back onto the food where they can be absorbed to produce heat. For maximum wall reflectivity it has been found that a good choice for a wall material is Specular+made by Material Sciences Corporation (MSC). This material is essentially a silverized steel that is protected with a plastic film. Silver has the highest reflectivity of all of the possible metallic reflectors. Polished aluminum is another good reflector, but its overall reflectivity is somewhat inferior to the MSC material. The preferred cavity wall 12 configuration is U-shaped with large radius bends in the comers for ease of cleaning and enhanced oven efficiency.

The cooking operation is initiated by the electronic controller 8 which illuminates either (or both in some instances) of the upper and lower lamps 46, 56 and begins to scan them past the food surfaces, heating the food from above and below. The lamps in the preferred embodiment for 120V operation are 1500 W to 2000 W tubular tungsten halogen quartz lamps and they normally operate at color temperatures of 2900–3000° K. Useful lightwave cooking can be maintained with color temperatures down to about 2500° K. Lamp lifetimes at normal operating temperatures exceed 2000 hours.

Figure 2:
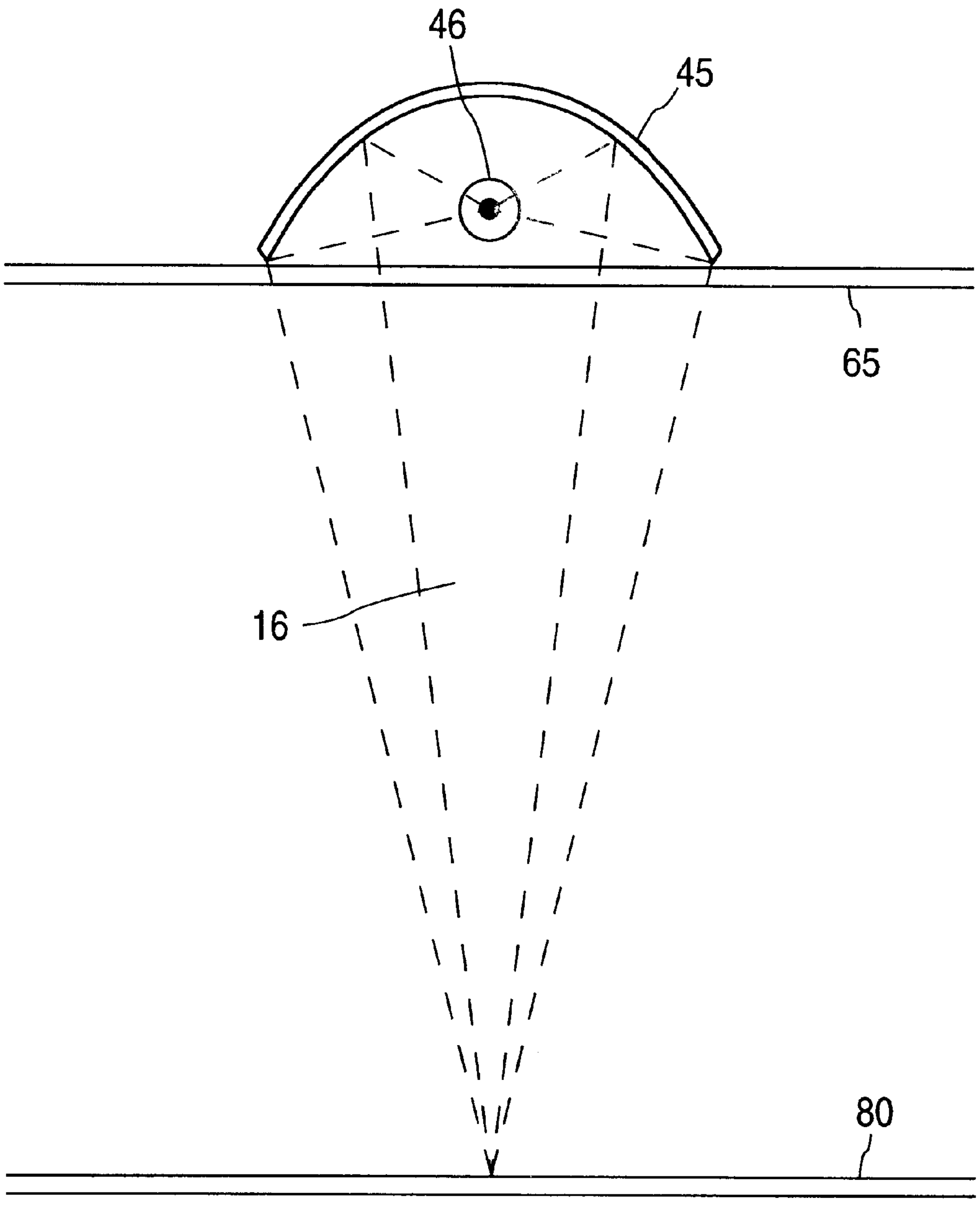
FIG. 2 is a side cross-sectional view of the reflector assembly of the present invention.

Each lamp is partially surrounded by a reflector 45,55. The reflectors are made of highly polished aluminum and are formed into a linear reflector with an elliptical cross-section. The shape of the reflector is depicted in FIG. 2. The elliptical reflector is shaped to focus the light 16 emitted from the upper lamp 45 at the top of an average foodstuff 80 (about 1" above the top of the lower shield 75).

The inventors have discovered an unanticipated effect of the use of elliptical focussing structures in a lightwave oven. Focusing the light radiation increases the light intensity at the food surface and thus drives more water is driven off the surface. If the surface water removal rate is higher than the water replenishment rate from the food interior, the surface water is removed. Without the evaporative cooling effect of the surface water the surface temperature will rise until the surface browned.

This effect has been put to use in controlling the cooking mode of the oven. Fast scan times mean that the dwell time of the focused lamp intensity on the foodstuff surface is minimal, and the interior replenishment of the surface water will stop the surface from browning. On the other hand, slow scan times have longer dwell times, so that the loss of the surface water initiates the surface browning. In all cases the total radiant energy delivered to the food is the same. This phenomena allows an independent browning/deep penetration control (the scan rate) not available with other lightwave ovens with static radiant sources. When browning is delayed, radiant energy continues to penetrate deeply into the food item.

As a general means of operation the top and bottom lamps 46, 56 are scanned together with only one lamp illuminated at a time. Naturally, depending on the cooking application it may also be useful to run two lamps simultaneously. When the upper lamp fixture 44 encounters a microswitch 47, 48 the electronic controller 8 reverses the rotation of the motor 31 and the scan begins in the opposite direction. At this time the electronic controller 8 can change the on/off characteristics of the two lamps, depending on the cooking mode desired. For example, in a "cook mode" the power would alternate between the upper and lower lamps, cooking the top of the food on one cycle and the bottom of the food on the return cycle. As further examples, grilling might be accomplished in a "grill mode" by leaving the bottom lamp 56 on continuously with the top lamp 46 off, so that a grill pan supporting the food would be heated mainly from beneath. Alternatively, a "browning mode" may be provided for enhanced, sustained browning and crisping the scanning top lamp 46 could be turned on continuously while the bottom lamp 56 remained off.

Cooking continues in this fashion until a predetermined time (preset with the control panel keys 14) elapses and the electronic controller 8 turns the oven off. Alternatively the food 80 can be viewed through the window 11 in the door 3, and when the food 80 is observed to be cooked to the desired doneness, the oven can be turned off manually. The present embodiment signals the user when the remaining time is within 30 seconds of the preset time, so that the user can watch the final stages of cooking to stop the oven at the optimum time.

The window 11 is made from a highly reflective material that allows about 0.1% of the incident light to pass through for viewing. This filtering protects the user's eyes from the intense light within the oven. Such filter materials can be obtained from Material Sciences Corporation (MSC) as thin silver films encapsulated between two sheets of plastic.

In the preferred embodiment described above the desired scan rate would be linear and the area beneath the lamp will be uniformly illuminated with the scan. The scan distance is approximately 13" and the lamp filament length of a 1500 W lamp is about 8". These parameters produce a usefully uniform area of illumination of about 9"×14" (126 in$^2$). Larger areas can be attained with higher wattage bulbs that have longer filaments, or by adding a secondary mechanical motion to the scan that offsets the lamp in the filament direction during alternate scans. In this embodiment, the scanning mechanism is capable of scan rates ranging from approximately 5–30 seconds for scanning the 13" scan distance—although other scan rates may be available. The rate at which scanning occurs is directed by the electronic controller and is determined according to the cooking operation to be carried out. For example, and as discussed above, a faster scanning rate may be utilized during the early part of the cooking cycle to allow for deep penetration cooking without browning. Afterwards, the controller may direct a slower scanning rate in order to brown the food surface.

In a second embodiment the transparent shield 75 on the bottom of the oven is replaced with a metal plate that absorbs the radiant energy from the lower lamp and converts it to heat. This plate serves as a hot plate to transfer the energy to the food by conduction. This embodiment reduces the cost of the lightwave oven by replacing a relatively expensive shield (glass ceramic material) with a cheaper metallic shield. As a further advantage this embodiment eliminates the chance of shield breakage when it is used to support various cooking containers. It was also discovered that the functionality of the metal plate could be enhanced if its bottom was blackened to absorb the maximum amount of energy from the lower lamp 56 and the top was coated with a material of intermediate reflectivity. The top reflectivity of the metallic shield is important because the illumination from the top lamps should not be used to heat the plate, but rather the light scattered off of the plate should hit the food from many angles and serve to heat it uniformly. It was found that a good reflectivity value for uniform heating was about 50% as measured over the spectrum of the tungsten-halogen lamps.

In still another embodiment the lower lamp scanning mechanism 35 is eliminated entirely. This gives a further saving in manufacturing cost. In this embodiment, the shield 75 is also a metal plate, but the reflectivity of the upper surface is reduced, so that the absorption from the top lamp is increased. The top lamp 46 is allowed to remain on continuously and it heats the plate 75 when it is near the ends of its scan and heats the food 80 directly in the middle of the scan. Thus both top (direct light absorption in the food) and bottom (conductive heating from the supporting shield) heating of the food is accomplished with only a single lamp.

This embodiment can be further improved by enabling the scanner to move at various rates as communicated from the electronic controller. Thus the scan can be controlled to stop near each edge of the lower shield plate 75 and heat up the plate only without directly illuminating the food and then move at controlled rates across the food to deep-heat or brown (depending on the scan rate) the foodstuff 80. The temperature of the lower shield plate can be monitored with a thermocouple or thermistor 13 under the plate and that feedback signal sent back to the electronic controller 8 to maintain a constant plate temperature for optimum cooking.

It should be noted that in this embodiment the single lamp is only turned on at the beginning of the cooking cycle and then allowed to remain at constant intensity throughout the cooking cycle. The various modes of cooking, baking, defrosting, warming, crisping and grilling are then accomplished entirely by lamp positioning and rate control. In this embodiment there are no inrush currents and their accompanying flicker to get back into the power lines, because the power for illumination is constant during the entire cooking cycle.

Experimental tests with the scanning lightwave oven in the above embodiments have shown that the cooking performance of this oven configuration is unsurpassed by other lightwave oven configurations. The illumination is very uniform, resulting in uniformly browned products, and the oven cooks very fast, leaving the food juicy and tasty. The table at FIG. 3 lists examples of foods cooked in the scanning lightwave oven. It should be noted that the times are quite fast, usually one-half the times of conventional thermal oven cooking. Further, the list shows the wide spectrum of foods that can be cooked successfully with this oven configuration.

It is also within the scope of the present invention to change the color temperature of the lamps during various parts of the cooking cycle, thus increasing the percentage of infra-red radiation, emitted in any part of the cooking cycle.

The oven of the present invention may be used cooperatively with other cooking sources. For example, the oven of the present invention may include a microwave radiation source. Such an oven would be ideal for cooking a thick, dense, highly absorbing food item such as roast beef. The microwave radiation would be used to cook the interior portions of the meat and the infrared and visible light radiation of the present invention would cook the outer portions.

It is to be understood that the present invention is not limited to the embodiments described above and illustrated herein. For example, it is within the scope of the invention to use a different number of lamps (more than 1 or 2) to scan past the food and achieve larger areas of uniformity or to eliminate the microswitch controlled scan pattern by using a stepping motor and reversing the scan after the countdown of a predetermined number of steps. Lamp 46 may be supplemented with one or more additional lamps that scan with lamp 46 or that remain stationary within the oven while lamp 46 scans. Similar arrangements may be configured as alternatives to the use of lower lamp 56.

We claim:

1. A lightwave oven comprising:

a housing including an oven chamber;

a food support within the oven chamber, the food support having an area;

at least one lightwave cooking lamp movably mounted within the oven chamber between a first position in which the lamp is positioned to direct radiant energy onto a first area of the food support and second position in which the lamp is positioned to direct radiant energy onto a second, separate, area of the food support;

a lightwave radiation absorbing shield position below the food support, the shield for absorbing radiation emitted by the lamp and for emitting heat towards the underside of the food support.

2. The lightwave oven of claim 1 wherein, when in the second position, the lamp is positioned to direct radiant energy onto the shield.

3. A lightwave oven comprising:

a housing including an oven chamber;

a food support within the oven chamber, the support having an area;

at least a first lightwave cooking lamp movable mounted within the oven chamber above said food support between a first position in which the first lamp is positioned to direct radiant energy onto a first area of the food support and a second position in which the first lamp is positioned to direct radiant energy onto a second, separate, area of the food support;

at least a second lightwave cooking lamp movably mounted within the oven chamber below a said food support between a first position in which the second lamp is positioned to direct radiant energy onto a first area of the food support and a second position in which the second lamp is positioned to direct radiant energy onto a second, separate, area of the foods support; and a lightwave radiation absorbing shield position below the food support, the shield for absorbing radiation emitted by the second lamp and for emitting heat towards the underside of the food support.

4. The lightwave of oven of claim 3 wherein the lamp is positioned within a reflector and wherein the reflector is moveable with the lamp between the first and second positions.

5. The lightwave oven of claim 4 wherein the reflector is elliptical in cross section.

6. A method of cooking food in a lightwave oven, comprising the steps of:

providing a lightwave oven having a food support and at least a first lamp position above the food item and at least a second lamp below the food support and the food item and positioned to direct radiant energy onto the food support;

positioning a food item on the food support;

illuminating the first and the second lamps; and moving the first lamp within the oven to cause the first lamp to scan the food item with radiant energy and simultaneously moving the second lamp within the oven to cause the second lamp to scan the food item with radiant energy whereby during the moving step the lamps are made to scan the food item in a first direction and are then caused to scan the food item in a second direction opposite to the first direction and wherein only the first lamp is illuminated during the movement in the first direction and only the second lamp is illuminating during movement in the second direction.

7. A method of cooking food in a lightwave oven, comprising the steps of:

providing a lightwave oven having a food support and at least one,lamp positioned to direct radiant energy onto the food support;

positioning a food item on the food support;

illuminating the lamp moving the lamp within the oven to cause the lamp to scan the food item with radiant energy in a first direction and then to scan the food item in a second direction opposite to the first direction, repeating the moving step multiple times throughout the cooking cycle;

during a first number of the multiple times the moving step is performed at a first scan rate selected to induce evaporation of surface moisture from the surface of the food item followed by replenishment of the evaporated surface moisture from within the food item; and during a second number of multiple times the moving step is performed at a second scan rate that is slower than the first scan rate, to induce browning at the surface of the food item.

8. The method of claim 7 wherein the lamp is operable at a plurality of colored temperatures and wherein the method includes the step of altering the colored temperature of the lamp at least once during cooking.

9. A method of cooking food in a lightwave oven, comprising the steps of:

providing a lightwave oven having a food support, at least one lamp positioned to direct energy onto the food support and a shield beneath the food support;

positioning a food item on the food support;

illuminating the lamp;

moving the lamp within the oven to cause the lamp to scan the food item with radiant energy;

moving the lamp into a position to direct radiant energy onto the shield to heat the shield and radiating heat from the shield onto the food item.

10. A method of cooking food in a lightwave oven, comprising the steps of:

providing a lightwave oven having a food support, at least a first lamp position above the food item and at least a second lamp below the food support and the food item and positioned to direct radiant energy on to the food support and a shield beneath the food support and above the second lamp;

positioning a food item on the food support;

illuminating the first and the second lamps;

moving the first lamp within the oven to cause the first lamp to scan the food item with radiant energy and simultaneously moving the second lamp within the oven to cause the second lamp to scan the food item with radiant energy;

directing radiant energy from the second lamp onto the shield to heat the shield and radiating heat from the shield onto the food item.

11. A method of cooking food in a lightwave oven, comprising the steps of:

providing a lightwave oven having a food support and at least one lamp positioned to direct radiant energy onto the food support;

positioning a food item on the food support;

illuminating the lamp;

moving the lamp within the oven to cause the lamp to scan the food item with radiant energy in a first direction and then to scan the food item in a second direction opposite to the first direction; and repeating the moving step multiple times throughout the cooking cycle;

during a first number of the multiple times the moving step is performed continuously and uninterrupted at a first scan rate selected to induce evaporation of surface moisture from the surface of the food item followed by replenishment of the evaporated surface moisture from within the food item.

* * * * *